Aug. 19, 1952 S. GILBERT 2,607,642
ANTIFRICTION BEARING AND ASSOCIATED MEMBER
Filed Oct. 25, 1946 2 SHEETS—SHEET 1
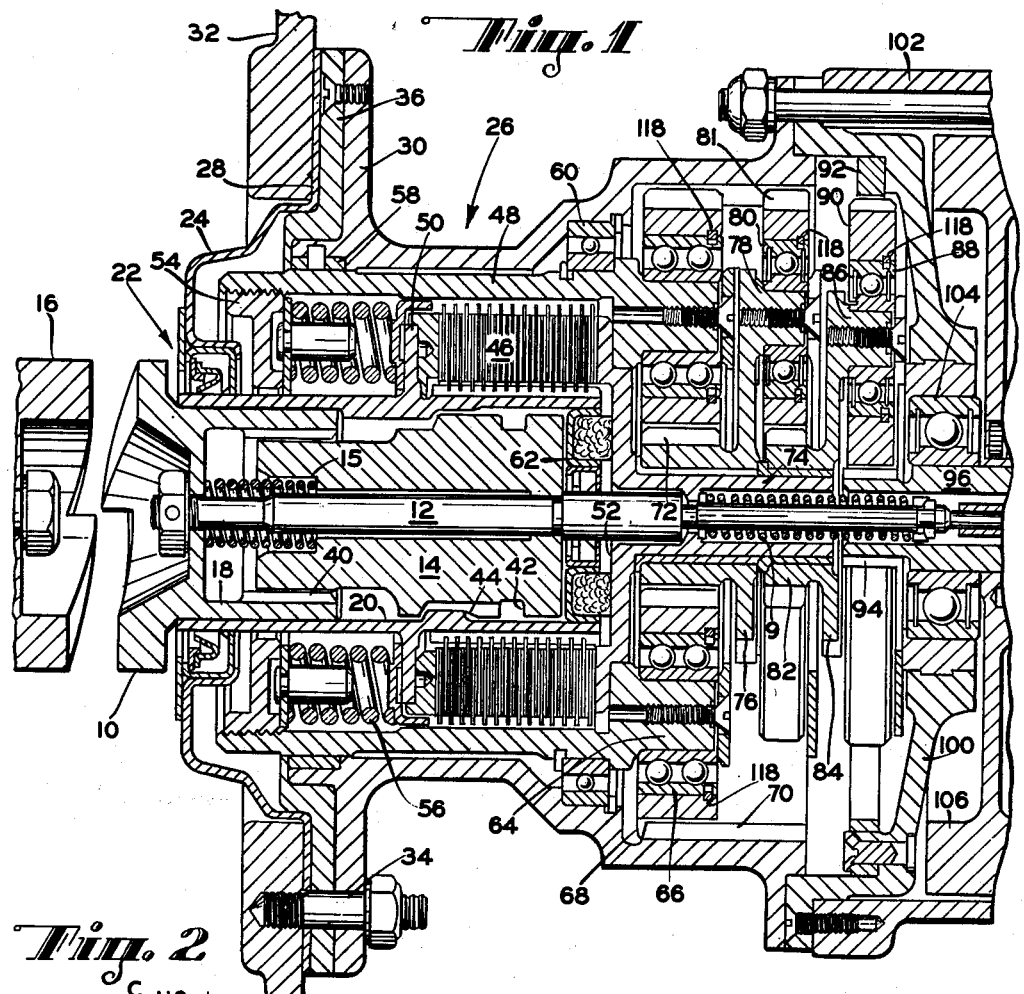
Fig. 1
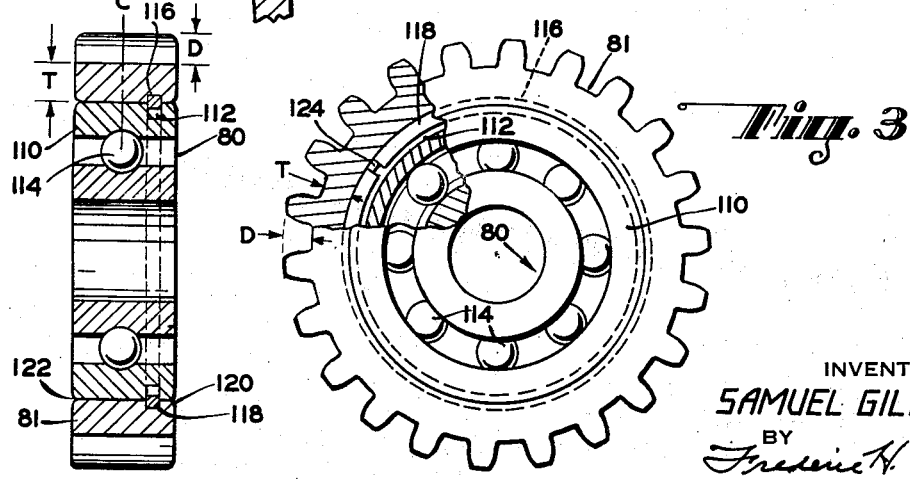
Fig. 2
Fig. 3
INVENTOR
SAMUEL GILBERT
BY
Frederic H. Miller
ATTORNEY Aug. 19, 1952     S. GILBERT     2,607,642
ANTIFRICTION BEARING AND ASSOCIATED MEMBER
Filed Oct. 25, 1946     2 SHEETS—SHEET 2
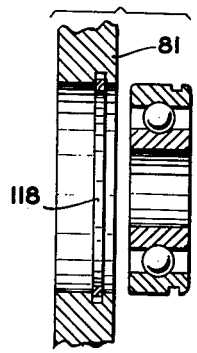
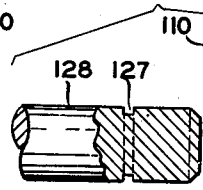
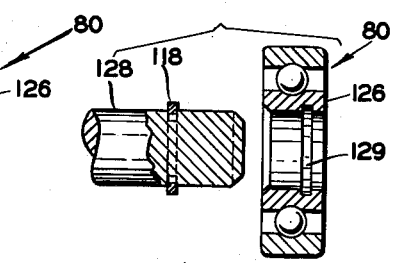
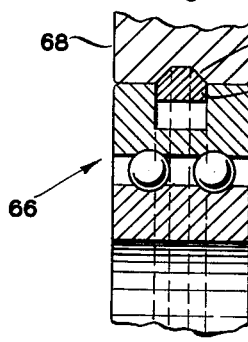
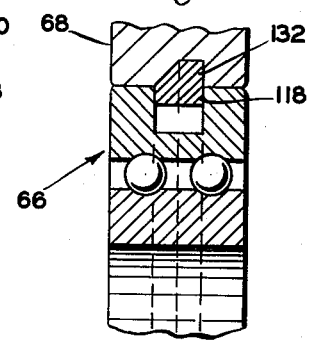
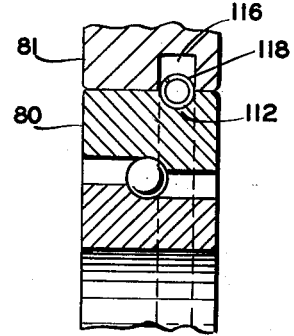
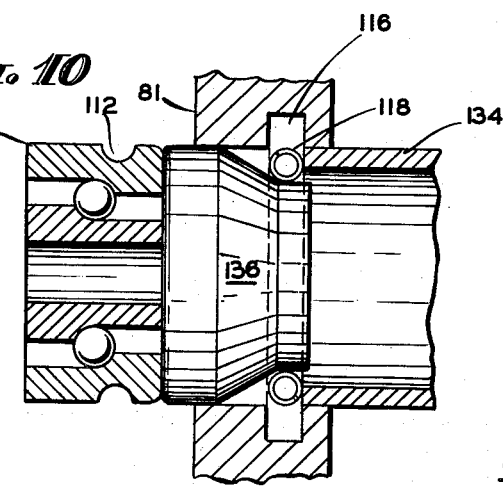
INVENTOR
SAMUEL GILBERT
BY
Frederic H. Miller
ATTORNEY Patented Aug. 19, 1952

2,607,642

UNITED STATES PATENT OFFICE 2,607,642

ANTIFRICTION BEARING AND ASSOCIATED MEMBER

Samuel Gilbert, Cedar Grove, N. J., assignor to Bendix Aviation Corporation, Teterboro, N. J., a corporation of Delaware Application October 25, 1946, Serial No. 705,515

1 Claim. (Cl. 308—236)

The invention hereof relates to anti-friction bearings and members, such as gears, which are supported by the bearings, and members, such as shafts and stationary parts, which support the bearings.

In fixing anti-friction ball or roller bearings in or on such members, it has long been, and still is, an extensive practice by others to stake at least one race of a bearing to one of the members.

Staking the race and the member together at a plurality of positions spaced about a periphery of the race, frequently subjects the race to irregular distortion, causes unbalance of the bearing and interferes with free regular operation of the balls or rollers, whereby the latter rub with various degrees of friction on race surface parts opposite the stake points. This effect may vary at different points in one bearing, with the effects in no two bearings likely to be the same.

Much trouble has been, and still is being, experienced in prior apparatus from this cause, the effects of which as cumulative, as in a single gear train having a plurality of anti-friction bearings.

In the latter case, the effect is transmitted to the gears, such that one gear of the train may be affected, not only by irregularities and unbalance in its bearing, but by irregularities and unbalance in the bearing of an associated gear, and this effect be transmitted from gear to gear throughout the train. A result is early breakdown of bearings or gears, or both, with adverse effects in elements driving the train and members being driven by the train.

Although the above-mentional disadvantages are present wherever anti-friction bearings are employed, as in motors, generators and many other devices in many fields, in which gears may or may not be employed, a particular example chosen to illustrate the improvements of the invention, which overcome the disadvantages of a single former bearing, and the cumulative disadvantageous effects of a plurality of such bearings, is an engine starter for aircraft.

In such example, which is in a field of particular importance, the above-mentioned disadvantages should, of course, not exist. In such example also and in other applications, the feature of being able to employ old parts over again, and the time element in effecting repairs, are also frequently of vital importance.

When, for instance, a gear must be replaced, either from the above-mentioned or other cause, and it may be necessary to reemploy the old bearing, providing the original staking has not too seriously affected it, the bearing must again be staked, to the new gear, with the still greater possibility of adverse results. The latter example is given to emphasize the fact that the gear and the staked bearing of former practice are not readily attachable to and detachable from, each other, with as little likelihood of damage to one or the other as by the present invention.

Various devices have heretofore been suggested for mounting anti-friction bearings relative to shafts, gears, stationary supports and the like, by the employment of rings, such as lock rings, all of which devices, so far as applicant is aware, are faulty in one way or another, rendering them impractical or impossible of employment in any of many applications, such as in the example given.

For instance, it has been suggested to form a groove in the periphery of a bearing, to place a ring partially in, and partially protruding radially from the groove, and to have separable holding means at opposite axial sides of the protruding portion of the ring for maintaining the bearing in fixed axial position. This construction, by the presence of the extra separable holding means, is out of the question for applications such as that herein illustrated, by reason of bulk, excessive number of parts, cost and other factors.

Another prior device employs a disc-like member entirely separate and apart from the bearing, but located beside the latter as positioning means therefor, and held by a lock ring, which construction obviously multiplies the number of parts, increases the size, weight and cost, and is impractical in many ways for applications as indicated herein.

Another prior device, embodying a split lock ring having a laterally bent end at the split, requires a relatively large hole locally at a part of the periphery of a member corresponding in position to a gear on the bearing. Such construction, for purposes hereof, would unbalance the bearing and the gear, and be impossible of employment, where the gear is a ring gear having a hub of small radial thickness compared to the depth of its teeth. By reason of the relatively greater radial space occupied by an anti-friction bearing compared to such space where an anti-friction bearing is not employed, ring gears having small radial hub thickness relative to the depth of the teeth are widely employed.

A further prior device has a split ring, a keyway radially opposite the ring split, and a key in the keyway and the ring split. With the keyway, the ring split and the key all at one local position on the bearing, the device is obviously very badly unbalanced and, although such device may be practical as in a roller skate or other place where balance is not important, it would definitely not be effective or employable for the purposes hereof.

Among the objects of the present invention are to overcome all of the above-mentioned and other disadvantages of prior structures of the class indicated, and to effect such results by novel effective means.

Another object is to provide means, of substantially the utmost in simplicity, for mounting an anti-friction bearing relative to a support or member as aforesaid, in a manner ensuring practically perfect balance, avoiding distortion, and enabling the bearing and the support to be separated without injury to either.

Another object, in cases where severe axial thrust may be imposed in service between a bearing and its support, is to provide a positive locking means against such thrust, but which locking means may be sheared or destroyed by an axial thrust much greater than such service thrust, without injury to either the bearing or the support.

Another object, in cases where lighter or substantially no axial service thrust is imposed in either direction between a bearing and a support, is to provide locking means, such as a lock ring, for effectively holding the bearing and the support together against all axial thrusts normally met in handling or service, and which enables not only the bearing and the support to be separated in either axial direction without injury to either, but also preserves the locking ring itself intact.

Another object, in cases where lighter or substantially no axial service thrust is imposed in one direction, but where severe axial thrust is imposed in the opposite direction, is to provide locking means for effectively holding the bearing and the support together against the lighter thrusts, and positively locking the bearing and the support together against the severe thrusts, and which locking means may be of the shearing type above mentioned, or of a type providing for separation of the bearing and a support without injury to any of the parts.

Another object is to facilitate the repair and replacement of parts of assemblies, in which at least one of the parts is an anti-friction bearing, and another part may be a ring gear, a shaft, and an annular stationary or rotatable member around a rotatable or stationary shaft or the like.

Another object is to provide an improved engine starter, especially of the aircraft type, or for other service where rapidity of replacement and repair of its parts may be necessary.

Another object is to provide a device of the above-indicated character that is simple and durable in construction, economical to manufacture, and effective in its operation.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawing:

Figure 1 is a side view generally in section, but having parts in elevation, of a portion of an inertia starter for an aircraft automotive engine:

Figure 2 is an enlarged detail section of one of several ring gear and bearing structures shown in Figure 1, in which a lock ring is carried by the outer race of a bearing prior to assembly with the gear;

Figure 3 is a side elevation, parts broken away, of the structure of Figure 2;

Figure 4 is a sectional view of a modification of the structure of Figure 2, showing a lock ring carried by a gear or a stationary support, and a bearing in position for insertion into the gear and having a groove in its outer race to receive the lock ring;

Figure 5 is a view similar to Figure 4 of a modification of the structure thereof, showing a shaft having an outer groove to receive a lock ring carried in a groove in the inner race of a bearing;

Figure 6 is a view similar to Figure 5 showing another modification of the invention;

Figure 7 is a view similar to the top portion of Figure 2 of another modification of the invention;

Figure 8 is a view similar to Figure 7 showing another modification;

Figure 9 is a view similar to Figure 7 illustrating the invention in further modified form; and Figure 10 is a view of the structure of Figure 9, together with parts or tools associated therewith, in relation to each other during the assembly of the structure of Figure 9.

Referring to Figure 1, which shows only a portion of an inertia starter sufficient for an understanding thereof, the portion shown comprises, in general, a jaw member 10 adapted for axial movement by a meshing rod 12 against the action of a spring 9, and through the intermediary of a screw shaft 14 and a spring 15, into engagement with an engine jaw element 16.

The jaw member 10 has a hollow shank portion 18 journaled in an axially stationary rotatable nut 20 surrounded by an oil seal ring device 22 in an end member 24 of a housing portion 26 having cooperating flanges 28 and 30, respectively, secured to an engine casing 32, as by studs 34, and between which flanges 28 and 30 is a ring 36.

The screw shaft 14, surounding the rod 12 in the nut 20, is connected to the latter, by long lead screw threads, and to the shank 18 by a spline connection 40. A shoulder 42 on the shaft 14 is adapted to engage a shoulder 44 on the nut 20 whereby to lock with the latter for turning the jaws 10 and 16 after the latter are engaged.

A torque limiting friction disc pack 46 is disposed around the nut 20 in a barrel 48 between a flange 50 of the nut and an end closure 52 of the barrel spaced from the right hand end thereof as shown. A ring nut 54, in the opposite end of the barrel 48, acts through a plurality of helical springs 56 and the nut flange 50 to urge the nut 20 and the pack 46 to the right, against the closure 52, for adjusting the friction between discs of the pack, which are splined to the barrel 48 and the nut 20, respectively. The barrel 48 is journaled in the housing portion 26, as by bearings 58 and 60, respectively.

A sealing device 62 prevents the passage of oil from the casing 32 through the seal from the left, and prevents particles released by friction between the discs of the pack 46 from reaching the seal at the right.

Trunnion extensions 64 of the barrel 48 support anti-friction bearings 66 carrying planet ring gears 68, which engage an orbital gear portion 70 of the housing portion 26 radially outwardly thereof, and a sun gear portion 72 radially inwardly thereof journaled on a trunnion extension 74 of the closure 52. The sun gear portion 72 carries a plate 76 having trunnions 78 supporting anti-friction bearings 80, on which are mounted planet ring gears 81, which engage the orbital gear 70 radially outwardly thereof, and a sun gear 82 radially inwardly thereof, also journaled on the extension 74. The sun gear 82 carries a plate 84 having trunnions 86 supporting anti-friction bearings 88, on which are mounted planet ring gears 90, which engage another orbital gear 92 radially outwardly thereof, and a sun gear 94 on a motor armature shaft 96.

The orbital gear 92 is supported on a partition 100, between the housing portion 26 and a housing portion 102, which partition supports the shaft 96 by an anti-friction bearing 104. An inertia member or flywheel 106 is secured to the shaft 96.

In operation, when the motor is energized, after the flywheel 106 comes up to speed, the meshing rod 12 is operated to the left, against the action of the spring 9, to engage the jaw 10 to the jaw 16. At the same time, the motor is deenergized, whereupon the energy of the flywheel 106 operates, through the gears above described, to rotate the barrel 48. The latter operates, through the disc pack 46, to turn the nut 20 whereupon, since the shoulder 42 has engaged the shoulder 44, the jaws 10 and 16 are rotated to start the engine. When the jaws are thus rotated to start the engine, the pack 46 absorbs the starting shock, whether the resistance be temporary or permanent, and if the engine backfires, the pack similarly absorbs the shock.

After the engine starts, if the meshing rod 12 is still maintained at the left against the action of the spring 9, the engine jaw 16 overrides the jaw 10 against the action of the spring 15, and upon release of the rod 12, the engine jaw 16 cams the starter jaw 10, and the spring 9 actuates the rod 12 to return the screw shaft 14 to the initial, right-hand position shown, in a usual manner.

If each of the planet ring gears 68, 81 and 90, of which, in this instance, there are nine in all, had the corresponding anti-friction bearings 66, 80 and 88 staked in place, it may be readily understood what the cumulative unbalance and damaging effect might be, with some of the bearings having the friction rubbing effect, above mentioned, in more or less synchronous or additive relation, and others having the friction effect at other points in the cycle of operation. The result may be, not so far as may be readily appreciable to an observer, but actually over various periods of time or number of starting operations, a very rapid deterioration of parts, and ultimate breakdown.

Rapid deterioration and breakdown may also occur in a single bearing.

To obviate these effects and to facilitate rapid repair from damage from other causes, the invention hereof is proposed, and comprises one form, as indicated in Figure 1, in association with each of the bearings 66, 80 and 88. This one form is illustrated in detail, in Figures 2 and 3, in connection with one of the bearings 80, and its ring gear 81 having small radial hub thickness T compared to the depth D of its teeth. With the obviously and necessarily crowded conditions of the parts in the example given, it would be impossible to employ any former structure which cuts out any appreciable part locally on the periphery of the bearing or the gear, which might cause unbalance whereby on test, either the bearing or the gear or the assembly thereof, would quickly come to rest at the same point after repeated spinnings.

Accordingly, in this instance, the outer race 110 of the bearing 80 is provided with an outer annular groove 112, which is closed at each axial side entirely thereabout. Also, in this instance, since the race is radially thinner at its axial center, opposite balls 114, in this instance, the groove 112 is placed at a radially thicker part of the race axially aside the axial center C.

The gear 81, having its axial center coincident with the corresponding center of the bearing 80, and being of substantially the same axial extent or width, is provided with a complemental groove 116 of substantially half the area of the bearing groove 112, obtained by making the latter substantially twice as deep, with the groove 116 in axially centered relation to the groove 112. The groove 116 is also closed at each axial side entirely thereabout.

The outer race 110 is, in this instance, also of a type in which the diameter is initially oversized by about twenty-five ten-thousandths of an inch, in which conditions, the race surface is not in proper relation to the balls 114. When the race is press fitted into the gear 81, the race surface assumes its proper position, this feature being cited to illustrate the fine considerations entering into apparatus of the type for which the present invention is intended, as against other apparatus in which such considerations are not present.

A resilient ring 118, which in the form of Figures 1, 2 and 3, is a split ring of rectangular stock conforming to the areas of the grooves 112 and 116, is initially expanded and allowed to contract into the groove 112 to its normal relaxed condition, in which its inner diameter is somewhat less than the outer diameter of the outer race 110. When the bearing 80 is axially thrust into the gear 81, as from the right as viewed in Figure 2, slight rounds or bevels 120 and 122, on the gear 81 and the bearing 80, respectively, facilitate the entry of the bearing into the gear, and also the contraction of the ring 118 farther into the groove 112. Standard bearings and gears of the types shown are generally formed with such rounds or bevels, which may be enlarged if necessary for certain applications. The ring 118 may also be contracted by hand or by a tool or machine. The ring itself may further be provided with a slight round or bevel for the same purpose.

When the bearing 80 is thrust to the position of Figure 2, or when the bearing is oppositely so thrust, the contracted ring 118 automatically expands partially into the groove 116, to have substantially half of its radial thickness in each of the grooves 112 and 116. Also, the split 124 of the ring 118 is preferably chosen such as to constitute a substantially minimum gap when the ring is contracted into the groove 112, and to be only slightly larger when expanded to operative position, this feature contributing to the effective balance of the assembly.

With the parts in the positions thereof in Figure 2, the bearing 80 and the gear 81 are locked together against substantial force in either axial direction, and the materials of the parts determine whether such lock is permanent, or whether the bearing and the gear may be separated without damage to either.

With the bearing 80, the gear 81 and the ring 118 all of material of comparable hardness, such as steel, the lock is permanent, in which case the parts may probably not be separable without damage to at least one or two of them.

With the bearing 80 and the gear 81 of hard materials, such as steel, and the ring 118 of relatively softer material, such as soft steel or bronze, axial force may be applied, between the bearing and the gear, sufficient to shear the ring, whereby to separate the bearing and the gear without injury to either, and to provide for the reassembly of either by the employment of a new ring.

In the remaining figures of the drawings, corresponding parts are designated by corresponding reference characters.

Figure 4 illustrates that the ring 118, instead of expanding after assembly of a gear or a stationary part or support 81 with a bearing 80, may be of the type which contacts after such assembly, and that it may be carried by the support 81 before the assembly, instead of on the bearing, with the ring grooves correspondingly modified and related.

Figure 5 illustrates that the inner race 126 of the bearing, and not the outer race 110, may carry the ring for cooperation with a groove 127 in a shaft 128. The inner and outer races could, of course, each carry a ring.

Figure 6 illustrates that the shaft 128 may carry the ring 118 for cooperation with a groove 129 in the inner race 126.

Figure 7 extends the ideas of the previous structures in that the ring 118, may be of the permanent type and provided with a portion 130 of substantially wedge-shape fitting a groove of corresponding shape in the support or gear 68. With the latter structure, the parts may be held against axial separation under substantial axial force, and be separated under greater axial force, when the axial side surfaces of the portion 130 and the groove are on the order of forty-five degrees or less, to the horizontal, as shown.

Figure 8 furthers the idea of Figure 7, in that the ring 118 may have a portion 132 beveled at one axial side and radially straight at the other axial side, in which case, the bearing 66 may be inserted into the member 68 from the right, prevented from withdrawal to the right, withdrawn to the left, and otherwise have characteristics similar to those of the structure of Figure 7.

Figure 9 indicates that the ring 118 may be of round rim section, with one or both of the grooves of corresponding or different shape. The ring 118, in Figure 9, or in any of the forms of Figures 1 to 6, inclusive, may be a solid split ring, as shown in Figures 1 to 6, or a complete contracting helical garter spring, as indicated in Figure 9, made up, as of helical turns, and having no split corresponding to the split 124. The ring of Figure 9 may be of the shear or removable type.

Figure 10 illustrates a manner of inserting the contracted ring 118 of Figure 9 in the outer groove 116, in which a sleeve 134 and a cone 136 are first passed through the gear 81 to the right while in the relation to the relaxed ring 118 shown, and followed by the bearing 80, during which movement the ring 118 is expanded into the groove 116 and held there until the groove 112 attains register with the groove 116, whereupon the spring 118 contracts to the intermediate state of tension in the groove 112 gripping the bearing 80, shown in Figure 9.

Although several embodiments of the invention have been illustrated and described, various changes in the form and relative arrangements of the parts, which will now appear to those skilled in the art, may be made without departing from the scope of the invention. Reference is, therefore, to be had to the appended claim for a definition of the limits of the invention.

What is claimed is:

In a gear adapted for high speed rotation relative to a supporting shaft of the type including a centrifugally balanced annular toothed portion having an internal annular groove at one side of the axial gear center, an anti-friction bearing having at least an outer housing, said outer housing being adapted for a press fit with said gear and having a complemental exterior annular groove adapted for axially centered register with said internal groove when said toothed portion and bearing are in an operative position, particularly characterized by both of said grooves being entirely enclosed on each side to form a completely enclosed annular channel, said exterior groove being of substantially the same width and twice as deep as said internal groove, a centrifugally balanced resilient ring-shaped element having a radial thickness substantially equal to the depth of said external groove and a normal diameter equal to the diameter of said internal groove and adapted to be compressed into said exterior groove to permit assembly, said resilient element being of a material substantially softer than said gear and outer housing and capable of shearing to provide for separation of said bearing and said gear under a force insufficient to injure said bearing or said gear.

SAMUEL GILBERT.

REFERENCES CITED

The following references are of record in the file of this patent:

UNITED STATES PATENTS

| Number | Name | Date |
|---|---|---|
| 2,051,704 | Harris | Aug. 18, 1936 |
| 2,198,376 | Cederberg | Apr. 23, 1940 |
| 2,273,772 | Pollitz | Feb. 17, 1942 |
| 2,363,412 | Gossling et al. | Nov. 21, 1944 |
| 2,374,990 | Gilbert | May 1, 1945 |